R. P. BROWN.
RECORDING INSTRUMENT.
APPLICATION FILED JAN. 7, 1916.
1,285,919.
Patented Nov. 26, 1918.
2 SHEETS—SHEET 1.
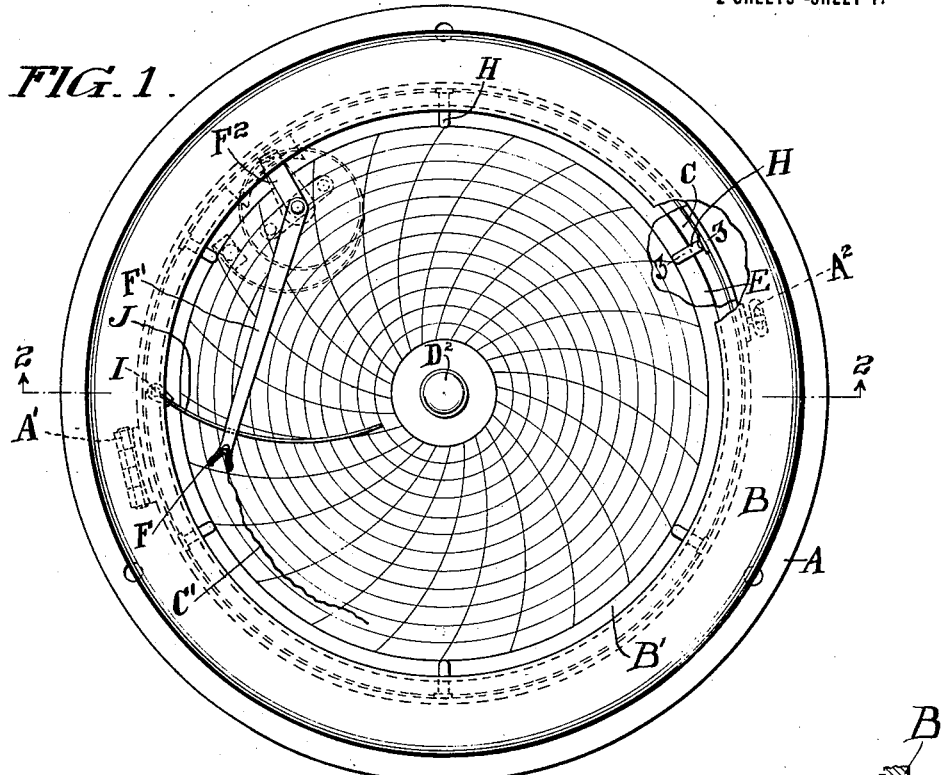
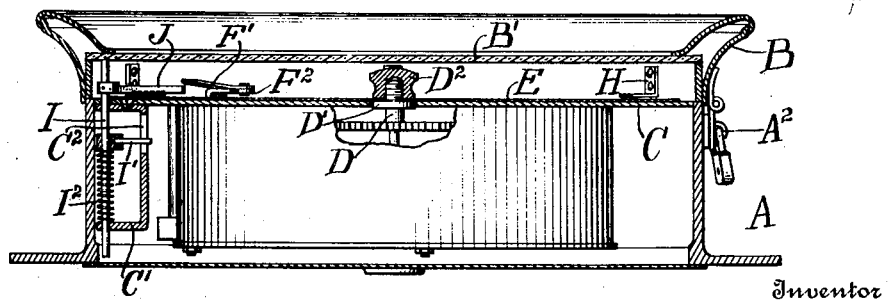

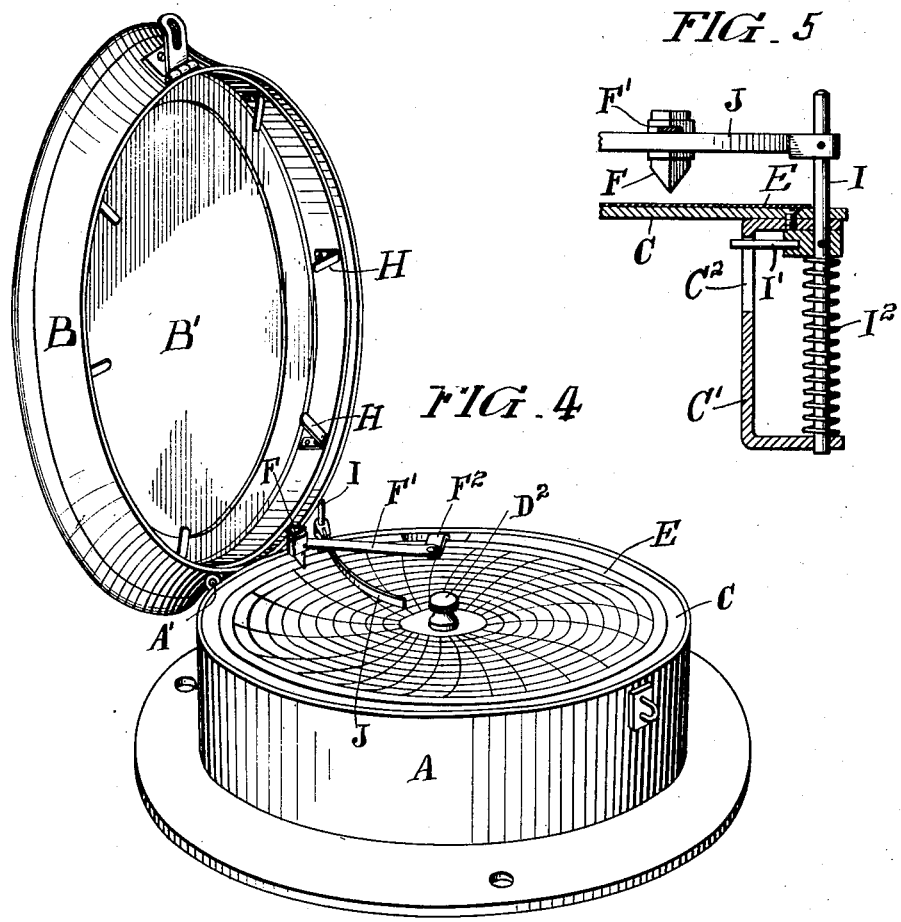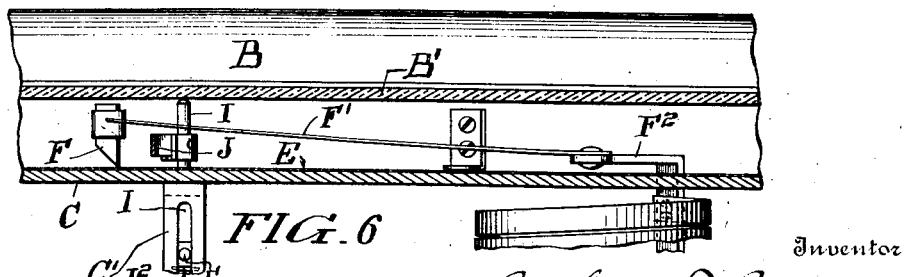

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

1,285,919.   Specification of Letters Patent.   Patented Nov. 26, 1918.

Application filed January 7, 1916. Serial No. 70,738.

*To all whom it may concern:*

Be it known that I, RICHARD P. BROWN, a citizen of the United States of America, and resident of the city and county of Philadelphia, in the State of Pennsylvania, have invented certain new and useful Improvements in Recording Instruments, of which the following is a true and exact description, reference being had to the accompanying drawings, which form a part thereof.

My present invention relates to recording instruments of the kind in which a pen or other marking device, carried by a meter or other instrumentality is employed to trace a record on a movable record sheet, and comprises improved means for controlling the relative position of the record sheet and marking device of such an instrument.

My invention was primarily devised for use in a recording meter of the type in which the record sheet, of paper or like material, is moved over a record supporting surface in order that a record may be traced on the sheet by a movable pen or other marking device operatively connected to a movable meter element, and one specific object of my invention is to provide means whereby the door of such an instrument casing may operate to hold the record sheet loosely against its supporting surface when the door is closed, without interfering with the insertion and removal of record sheets when the door is open. A second specific object of my invention is to provide simple and effective automatic means for insuring the desired operative relation between the marking device and the record sheet when the door is closed, and for holding the marking device away from the record sheet when the door is open to thereby facilitate the insertion and removal of record sheets.

The various features of novelty which characterize my invention are pointed out with particularity in the claims annexed to and forming a part of this specification. For a better understanding of the invention however, and the advantages possessed by it, reference should be had to the accompanying drawings and descriptive matter in which I have illustrated and described a preferred embodiment of my invention.

Of the drawings:

Figure 1 is a plan view of a recording meter constructed in accordance with the present invention;

Fig. 2 is a section taken on the line 2—2 of Fig. 1;

Fig. 3 is a partial sectional elevation taken on the line 3—3 of Fig. 1;

Fig. 4 is a perspective view of the meter with the casing door shown in open position;

Fig. 5 is a partial sectional elevation taken oppositely to Fig. 2 and on a larger scale; and Fig. 6 is a partial sectional elevation taken at right angles to Fig. 5.

In the drawings I have illustrated the use of my invention in a recording instrument of a well known type, in common use. The instrument shown comprises a casing A with a door B hinge connected thereto at A'. $A^2$ represents means employed to secure the door B in its closed position. The body of the casing A is shown as cylindrical, and the door B comprises an annular frame and a transparent window or glass panel B' proper. Within the casing there is mounted a record supporting surface or table C extending parallel to the glass place B' when the door is in its closed position. Projecting centrally through the table C is an arbor D rotated by the clock mechanism or spring motor. The arbor D comprises a hub or head D', and a threaded extension therefrom on which a clamping nut $D^2$ is screwed. The clamping nut $D^2$ is employed to detachably clamp a paper disk or other record sheet E which is apertured to receive the threaded portion of the spindle D against the end of the hub D'. In operation the sheet E rests against, and is rotated over the surface of the table C by the rotation of the clock driven spindle D. F represents the marking device which, as shown, is a pen of a type commonly employed in recording instruments of this type, and is carried at the end of a flexible arm F' which swings over the record sheet between the latter and the door panel B'. The arm F' is secured to and forms a part of the movable meter element $F^2$ which is pivoted to turn about an axis parallel to the arbor D and lying beyond the periphery of the record sheet.

In so far as already described the instrument illustrated contains nothing novel but is of a type in common use for recording temperatures, pressures, electrical quantities, etc., and it is to be observed that the utility of my invention is independent not only of the purpose, but also of the character of the meter or analogous element of the recording instrument with which my invention may be used.

As already stated, my present invention is concerned with the means which I provide to insure the desired relation between the record sheet and recording device in the regular operation of the instrument, while facilitating the insertion and removal of a record sheet when this is necessary or desirable. For the purpose of holding the record sheet at its peripheral edge loosely against the table C in the normal operation of the instrument, I provide the door with fingers or projections H which, as shown, are in the form of L-shaped pieces, each having one leg screw connected to the frame of the door B, while the other leg extends parallel to the table C and is spaced away from the latter by a distance slightly greater than the thickness of the record sheet E. With this arrangement the sheet of paper is held smoothly against the table C and is prevented from buckling or wrinkling by the projections H when the door B is closed as it is in the normal use of the instrument. When the door is opened, however, the fingers H are moved into a position in which they do not interfere with the removal or insertion of a record sheet. The previously used record sheet may then be freed by unscrewing the clamping nut $D^2$ and lifted off the table C to make way for the new record sheet.

Normally the pen or other recording device F is held against or in close proximity to the record sheet either by its own weight or through the resiliency of the arm F'. When it is desired to remove an old record sheet or introduce a new record sheet, it is desirable to have the recording device held away from the record sheet, and this I accomplish with the apparatus shown, by means comprising a door operated spring plunger I. The latter is mounted in the instrument at a point beyond the periphery of the record sheet and movable in a direction parallel to the axis of the shaft D. As shown, the plunger I projects through the table C and has bearings in the ends of a bracket member C' secured to the under side of the table. An arm I' secured to the plunger I and working in a slot $C^2$ in the bracket C' prevents rotation of the plunger I without interfering with its movement parallel to its length. The plunger I carries an arm J which, as shown, is curved and extends generally parallel to the curved path of movement of the recording device F and lies between the table C and the arm F' carrying the marking device F. When the door B is in its closed position it engages the adjacent end of the plunger I and forces the latter inward to the position shown in Fig. 2 and in Fig. 6, in which the arm F' swings clear of the arm J. When the door is opened however, the plunger I is free to move outward as it then does under the action of the spring $I^2$ acting between the arm I' and the inner portion of the bracket C'. The outward movement of the plunger I under the action of the spring $I^2$ is arrested by the engagement of the arm I' with the outer end of the bracket C'. In this outward position of the plunger I, the arm J engages the meter arm F' and holds the marking device F a substantial distance away from the recording sheet as is clearly shown in Fig. 5. When the door B is open therefore, neither the marking device F, nor the fingers or projections H interfere with the removal of the old record sheet or the insertion of a new sheet, but as the door is closed the projections H engage the record sheet and loosely but positively hold it against appreciable displacement, while the plunger is forced into its inward position in which the recording device F is permitted to assume its operative relation with the record sheet C to trace the record C' thereon.

While in accordance with the provisions of the statutes I have illustrated and described the best form of my invention now known to me, it will be apparent to those skilled in the art that changes can be made in the form of my invention without departing from its spirit, and that some features of my invention can be used without a corresponding use of other features.

Having now described my invention, what I claim as new and desire to secure by Letters Patent, is:—

1. In a recording instrument, the combination with an instrument casing provided with a hinged door, of means located within the case for moving and supporting a record sheet, a pivotally mounted marking device swinging over said sheet, a plunger extending transversely to said record sheet and comprising an arm which extends between said device and the record sheet, said plunger being engaged by the door and forced inward thereby when the door is closed so that said arm is then held out of contact with said device, and resilient means operating to move said plunger in the direction in which said arm engages with said marking device and lifts it away from said record sheet when said door is open.

2. In a recording instrument, the combination with the case provided with a door, of a record sheet support, means for moving said sheet over said support, marking element interposed between the door and the position occupied by a record sheet mounted on said support, and means carried by said door for engaging said sheet to hold the latter loosely against said support when the door is in its closed position.

3. In a recording instrument, the combination with the case provided with a door, of a record sheet support within said case, a rotating arbor projecting therefrom, a disk record sheet centrally secured to and rotated by said arbor, a marking element interposed between said door and record sheet and means carried by said door for engaging said sheet adjacent its periphery to hold the latter loosely against said support when the door is in its closed position.

4. In a recording instrument, the combination with an instrument casing provided with a hinged door, of a record support, means for moving a record sheet over said support, a marking device movable over said sheet, and door controlled means for holding said marking device out of contact with said sheet when the door is open, and means attached to the door for engaging said sheet to hold it against said record support when the door is closed while moving out of engagement with the sheet when the door is open.

5. In a recording instrument, the combination with an instrument casing provided with a hinged door, of a record support, means for moving a record sheet over said support, a marking device, and door controlled mechanism for moving said marking device out of engagement with the record sheet when the door is opened, and means carried by said door for engaging said sheet and loosely holding it against its support when the door is closed.

RICHARD P. BROWN.